United States Patent
Iyangar et al.

(10) Patent No.: US 10,324,771 B1
(45) Date of Patent: Jun. 18, 2019

(54) METHODS AND APPARATUS FOR A STORAGE SYSTEM HAVING STORAGE AUTOMATION WITH INTEGRATED DRIVERS

(71) Applicant: EMC CORPORATION, Hopkinton, MA (US)

(72) Inventors: Sreenidhi R. Iyangar, Bangalore (IN); Anil Degwekar, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 28 days.

(21) Appl. No.: 14/976,325

(22) Filed: Dec. 21, 2015

(51) Int. Cl.
  *G06F 9/54* (2006.01)

(52) U.S. Cl.
  CPC .............. *G06F 9/541* (2013.01); *G06F 9/548* (2013.01)

(58) Field of Classification Search
  CPC .................................. G06F 9/541; G06F 9/548
  USPC .......................................................... 719/321
  See application file for complete search history.

(56) References Cited

U.S. PATENT DOCUMENTS

| | | | | |
|---|---|---|---|---|
| 7,079,839 | B1* | 7/2006 | Papineau | H04L 67/04 455/412.1 |
| 7,941,813 | B1* | 5/2011 | Protassov | G06F 9/4411 710/33 |
| 8,219,653 | B1* | 7/2012 | Keagy | G06F 8/63 709/222 |
| 9,672,047 | B1* | 6/2017 | Deiderich, III | G06F 9/4411 |
| 2003/0135509 | A1* | 7/2003 | Davis | H04L 63/0227 |
| 2007/0234294 | A1* | 10/2007 | Gooding | G06F 11/3664 717/124 |

OTHER PUBLICATIONS

EMC ViPR Version 1.1.0 Concepts Guide; Feb. 2014; 42 pages.*
Parashurham Hallur; Third Party Array Support in ViPR Through OpenStack; Nov. 24, 2014; 3 pages.*

* cited by examiner

*Primary Examiner* — S. Sough
*Assistant Examiner* — Kimberly L Jordan
(74) *Attorney, Agent, or Firm* — Daly, Crowley, Mofford & Durkee, LLP

(57) ABSTRACT

Method and apparatus for receiving an access request for an array from a controller of a platform that abstracts, pools and automates physical storage for a data center, processing the access request with an API service, and analyzing the access request by a controller service after processing by the API service. The controller then requests a third party driver from a driver module for the array. The third party driver processes the request to access the array and receive data from the array.

16 Claims, 8 Drawing Sheets

METHODS AND APPARATUS FOR A STORAGE SYSTEM HAVING STORAGE AUTOMATION WITH INTEGRATED DRIVERS

BACKGROUND

As is known in the art, system components, such as storage arrays, can have proprietary interfaces for enabling access to the storage. Storage drivers for various arrays from various venders may need to be developed to enable a system to access the storage. Whenever a new array is released that will be supported by the system, the array features are studied by the proprietor of the system to develop a new driver for the array. As vendors upgrade existing arrays with new features, the existing driver may need to be modified to support the new features. It will be appreciated that the entity providing the system must expend significant resources supporting third party components, such as storage arrays.

In addition vendors may want to keep some or all of the array specification confidential rendering a driver obsolete. Further there could be some special purpose array of limited distribution for which it may be impractical to develop suitable drivers. It will be appreciated that a system supporting a variety of storage systems provided by third parties can become unduly burdensome over time.

SUMMARY

In one aspect of the invention, a method comprises: receiving an access request for a storage array from a controller of a platform that abstracts, pools and automates physical storage for a data center; processing the access request with an API service; analyzing the access request by the controller after processing by the API service; requesting, by the controller, a third party driver from a driver module for the array; processing of the request by the third party driver to access the array; and receiving data from the array.

The method can further include one or more of following features: binding, by a RMI server, a remote object for the third party driver in a RMI registry, locating the remote object in the RMI registry by the controller, after locating the remote object, using remote method invocation by the client to contact the third party driver object, configuring a policy file for the third party driver, configuring the policy file to limit access to read/write operations to only the array associated with the third party driver, configuring the policy file to allow/block particular directories/files with read/write permission, configuring the policy file to allow/block particular ports to listen/connect, receiving an updated version of the third party driver from the third party, and/or the controller limits functionality of the third party driver to REST calls from the third party driver to the array.

In another aspect of the invention, an article comprises: a non-transitory computer readable medium having stored instructions that enable a machine to: receive an access request for a storage array from a controller of a platform that abstracts, pools and automates physical storage for a data center; process the access request with an API service; analyze the access request by the controller after processing by the API service; request, by the controller, a third party driver from a driver module for the array; process the request by the third party driver to access the array; and receive data from the array.

The article can further include instructions for one or more of the following features: binding, by a RMI server, a remote object for the third party driver in a RMI registry, locating the remote object in the RMI registry by the controller, after locating the remote object, using remote method invocation by the client to contact the third party driver object, configuring a policy file for the third party driver, configuring the policy file to limit access to read/write operations to only the array associated with the third party driver, configuring the policy file to allow/block particular directories/files with read/write permission, configuring the policy file to allow/block particular ports to listen/connect, receiving an updated version of the third party driver from the third party, and/or the controller limits functionality of the third party driver to REST calls from the third party driver to the array.

In a further aspect of the invention, a system comprises: a platform to abstract, pool and automate physical storage for a data center, the platform including: a controller to receive an access request for a storage array; and an API service to process the access request; wherein the controller is configured to: analyze the access request after processing by the API service; request a third party driver from a driver module for the array, wherein the third party driver is configured to process the request to access the array; and receive data from the array.

One of more of the system components can be further configured for one or more of the following features: binding, by a RMI server, a remote object for the third party driver in a RMI registry, locating the remote object in the RMI registry by the controller, after locating the remote object, using remote method invocation by the client to contact the third party driver object, configuring a policy file for the third party driver, configuring the policy file to limit access to read/write operations to only the array associated with the third party driver, configuring the policy file to allow/block particular directories/files with read/write permission, configuring the policy file to allow/block particular ports to listen/connect, receiving an updated version of the third party driver from the third party, and/or the controller limits functionality of the third party driver to REST calls from the third party driver to the array.

BRIEF DESCRIPTION OF THE DRAWINGS

The foregoing features of this invention, as well as the invention itself, may be more fully understood from the following description of the drawings in which.

DETAILED DESCRIPTION

Figure 1:
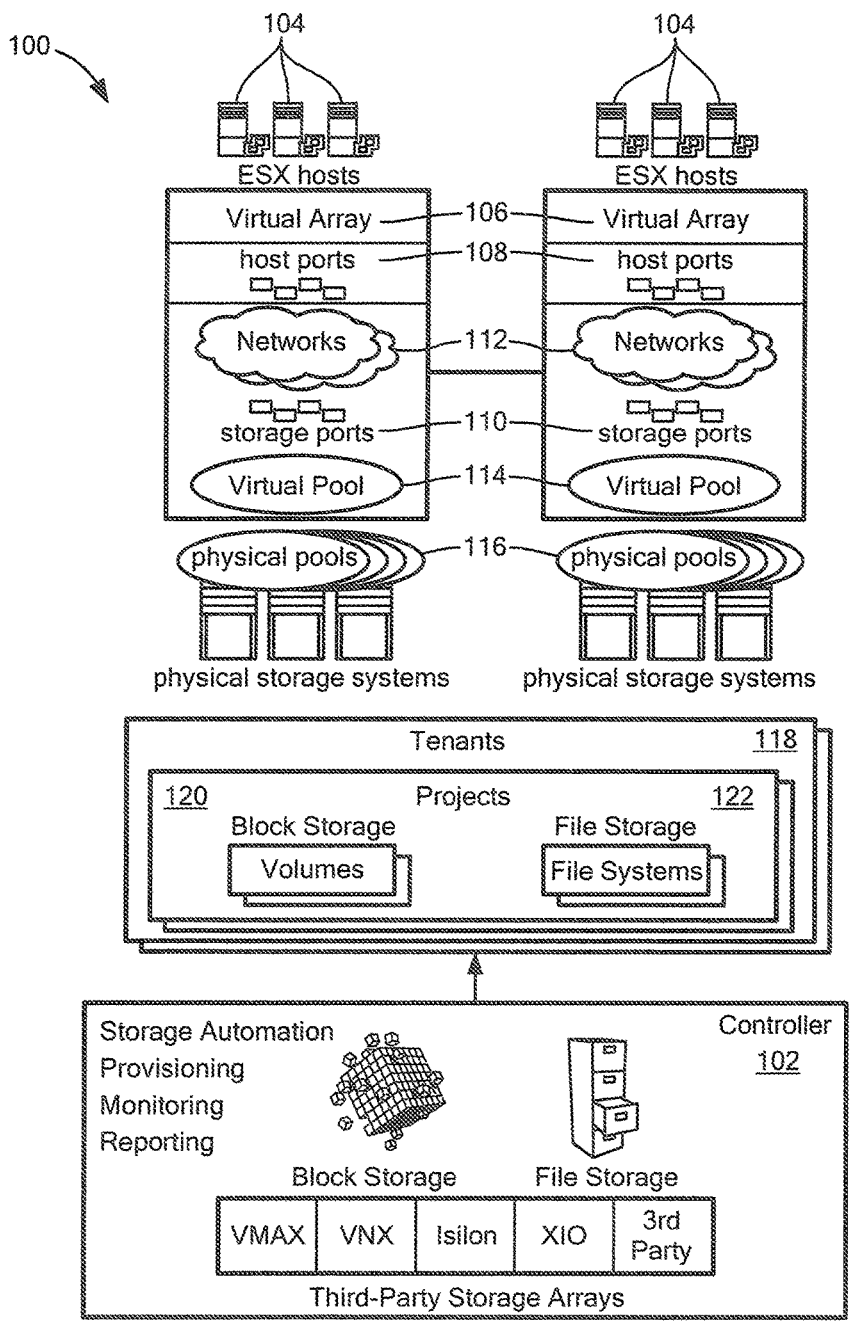
FIG. 1 is a schematic representation of a storage abstraction platform having third party driver integration in accordance with illustrative embodiments of the invention.

Embodiments of the disclosure provide a controller for a software defined platform that abstracts, pools, and automates the underlying physical storage infrastructure for a data center and includes integrated drivers, such as storage drivers from a third party. In general, the controller provides a single control plane to data center administrators to manage heterogeneous storage environments including block and file storage from a variety of vendors. The controller decouples the control path from the data path. The ability to abstract the control path allows storage management to operate at the virtual layer. In embodiments, the controller does not sit in the data path for file and block stores for ensuring that applications can access storage and data services embedded in the storage arrays without performance degradation.

The controller can be deployed as a virtual application (vApp) containing functionality to automate block and file storage provisioning tasks. A controller controls the storage resources within a virtual data center. The storage virtualization that the controller provides enables several physical storage pools to be combined into a controller virtual storage pool, or several physical storage arrays to be added into a virtual array.

Administrators can define policies through controller abstractions of virtual pools and virtual arrays so that the controller can abstract and pool storage resources based on storage attributes. Once the virtual pools and arrays are set up, storage provisioning tasks are automated and delivered to end users as services through a self-service catalog.

The controller enables software-defined data centers by providing storage automation capabilities for multi-vendor block and file storage environments, management of multiple data centers in different locations with single sign-on data access from any data center and data replication between geographically-dispersed data centers.

After the controller is deployed, set up of the virtual data center controller includes adding storage arrays, which can be referred to as storage systems in the controller virtual data center. When an administrator adds storage systems to the controller virtual data center, the controller discovers the array physical ports and storage pools and brings them under controller management. The controller uses the physical pools and ports on the storage systems and natively discovers and manages the block and file storage systems listed in a support matrix. The controller can also support discovery of third-party array support through OpenStack, for example. As described more fully below, the controller can receive drivers from third party vendors and integrate them within the controller without comprising system security.

In embodiments, the controller includes management interfaces (API, UI, and CLI) to provide maximum flexibility. A REST Application Programming Interface (API) allows application development without regard to the underlying hardware and software. A web-based User Interface (UI) provides the ability to configure and monitor the controller, as well as perform self-service storage provisioning tasks. A Command Line Interface (CLI) provides an interface for developers and data center administrators to manage storage resources.

FIG. 1 shows a controller virtual data center 100 providing a logical construct that can map to a physical data center. A controller 102 provides storage automation for multi-vendor block and file storage and management. The virtual data center 100 comprises a collection of storage infrastructure that can be managed as a cohesive unit by data center administrators. The controller 102 abstract and automates the underlying physical storage infrastructure for the data center and includes integrated drivers, such as storage drivers from a third party, as described more fully below.

In embodiments, the data center 100 hosts include hypervisors 104, such as ESX hosts, for deploying and serving virtual computers. A virtual array 106 includes host ports 108 and storage ports 110 for the network 112. A virtual pool 114 is formed from physical storage systems 116. The data center 100 can support tenants 118 with projects having block storage 120 and file storage 122.

The virtual data center 100 represents the span of control of the controller 102, where a single virtual data center exists for each controller. The virtual data center 100 enables a controller administrator to discover physical storage 116 and abstract it into virtual arrays 106 and virtual pools 114. These abstractions enable software-defined storage to allow administrators to implement policies to manage storage.

The controller virtual array 106 and pool 114 abstractions significantly simplify the provisioning of block and file storage 120, 122. Users consume storage from virtual pools 114 of available storage which relieves storage administrators from provisioning tasks. When end users provision storage, they need to know only the type of storage (virtual pool) and the host/cluster to which the storage should be attached. They do not have to know the details of the underlying physical storage infrastructure. Controller 102 resources are contained and managed in the virtual data center 100 which is the top-level resource in the controller.

Figure 2:
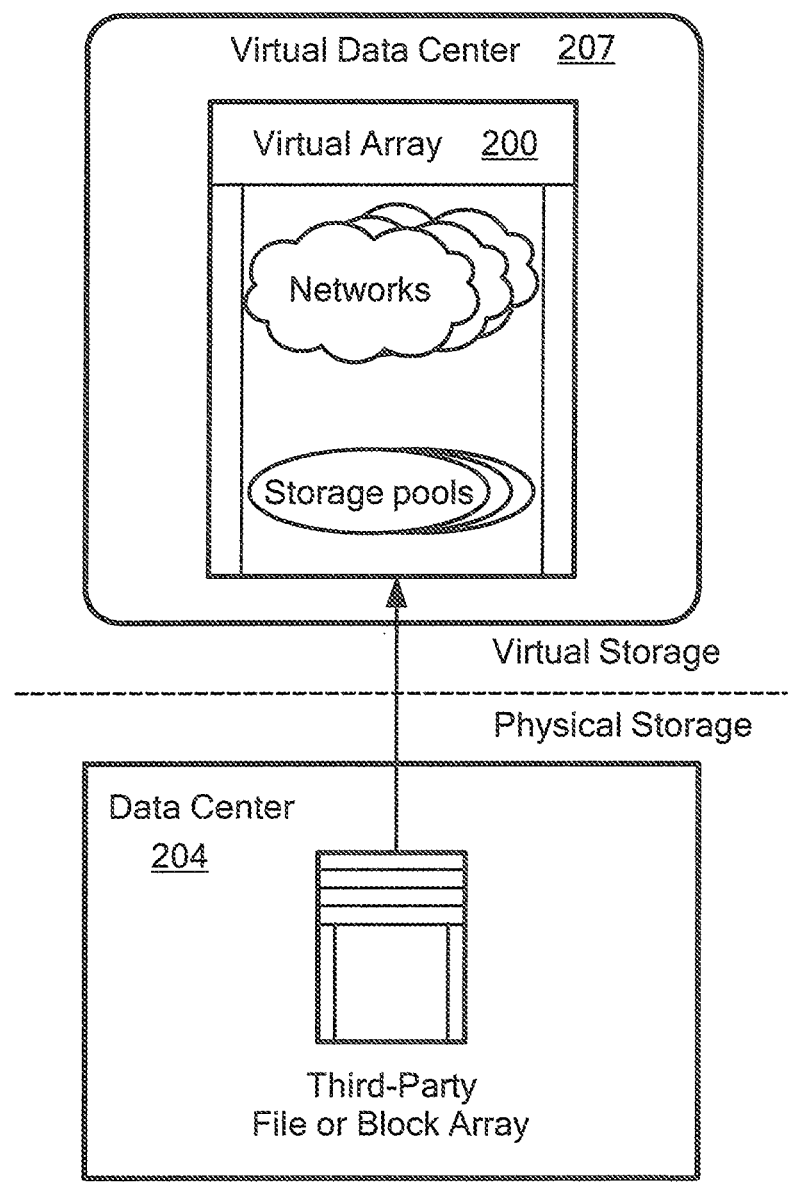
FIG. 2 is a schematic representation showing further detail of a virtual array in FIG. 1 in accordance with illustrative embodiments of the invention.

FIG. 2 shows a controller virtual array 200 that is an abstraction of underlying storage infrastructure that defines a logical location. The virtual array is a controller abstraction for underlying physical storage (arrays) and the network connectivity between hosts and the physical storage.

An administrator can the virtual array 200 to partition a controller virtual data center 202 into groups of connected compute, network, and storage resources for purposes of fault tolerance, network isolation, tenant isolation, etc. With the controller virtual array 200, the unique capabilities of the physical arrays 204 are available, but the controller automates the operations of the different array tools and processes to simplify provisioning storage across a heterogeneous storage infrastructure. In this way, the controller can make a multivendor storage environment look like one big virtual array. In a data center environment, virtual arrays can be large-scale enterprise SANs or computing fabric pods.

When an administrator creates a virtual array in the user interface, an entire physical block or file array can be added to the virtual array, which brings the storage ports, pools, networks, switches, and connected host endpoints associated with the physical array under controller management. If desired, administrators also can manually add storage ports, pools, and networks to virtual arrays.

Network connectivity defines a virtual array and includes SAN and IP networks connecting the physical arrays and hosts, SAN switches (fabric managers) in the SAN networks, host and storage ports connected to the networks, and controller virtual pools (virtual pools associated with the physical pools on the arrays are brought into the virtual array).

After the administrator creates virtual arrays with their host-to-array network connectivity, the administrator then carves the underlying physical storage in the virtual array into policy-based virtual pools that have defined storage capabilities. By creating and defining the virtual pools in the virtual arrays, controller policies can be built and automatically applied by controller across heterogeneous arrays. An administrator can group many physical arrays into a virtual array and can also partition a single physical array into several virtual arrays.

An Access Control List (ACL) controls tenant access to each virtual array. Only tenants in the virtual array's ACL receive access to provision to that virtual array. The administrator sets the ACL for a virtual array.

Figure 3:
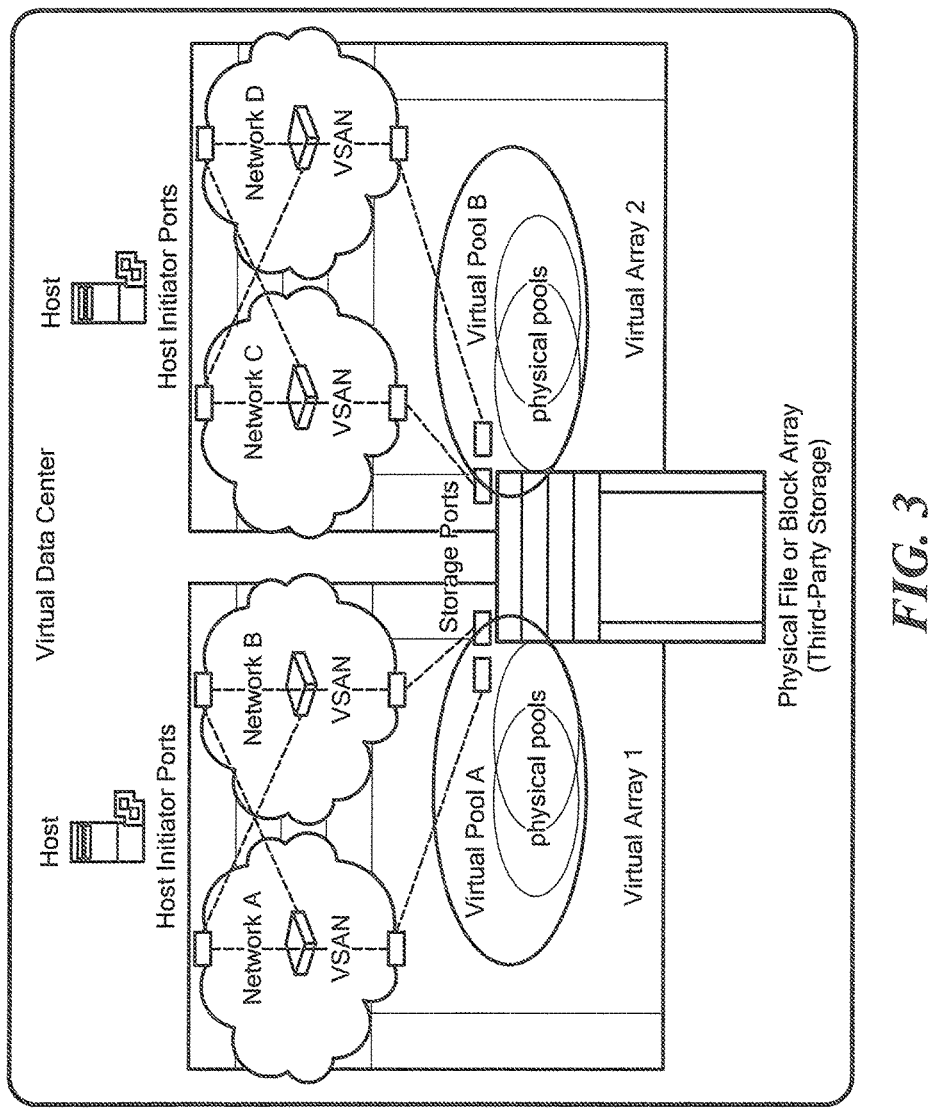
FIG. 3 is a schematic representation of a virtual data center provided by a storage abstraction platform having third party driver integration in accordance with illustrative embodiments of the invention.

FIG. 3 shows a virtual data center partition of a single physical array into two virtual arrays. Virtual Array 1 includes Networks A and B with a collection of connected host and storage ports and Virtual Pool A on the array. Physical devices in a virtual array communicate with each other in the virtual array for the controller to manage the storage infrastructure. After a user requests a volume or file system export from the array to make the storage visible on a host, the controller determines which network in the virtual array contains the desired host initiator ports and storage ports, and then selects the switch that can manage that network.

In embodiments, block and file virtual pools are controller abstractions of underlying physical storage tiers with defined performance and protection characteristics. After creation of a virtual array, block/file virtual pools are created in the virtual array. A virtual pool represents a storage service offering from which storage can be provisioned. A virtual pool can reside in a single virtual array, or it can span multiple virtual arrays.

Two types of virtual pools include block virtual pools and file virtual pools. Block virtual pools and file virtual pools are sets of block and file storage capabilities that meet various storage performance and cost needs. An administrator can create and configure block and file virtual pools in a virtual data center. Rather than provision capacity on storage systems, an administrator can enable users to use block and file virtual pools that meet requirements. After virtual pool creation, users can pick which virtual pool they want their storage to use.

For block and file virtual pools, the System Administrator defines a set of storage service capabilities, such as: type of storage (file or block), protocol (FC, iSCSl, CIFS, NFS), storage system type (e.g., VMAX/VMAX3, VNX block or file, VNXe block or file, Hitachi, ScaleIO, XtremIO, IBM XIV, third-party block, Isilon, NetApp, Data Domain), protection characteristics, and/or performance characteristics.

The physical storage pools are then assigned on the controller-managed storage systems to the virtual pool. The controller automatically matches existing physical pools on the controller-managed storage systems to the virtual pool characteristics as specified.

For example, the System Administrator defines two virtual pools in the file store:

Tier 1 virtual pool with high-speed I/O and data protection capabilities optimized to minimize disruption to database access for critical business applications; and Tier 2 virtual pool that has lower I/O speed and no data protection capabilities.

Figure 4:
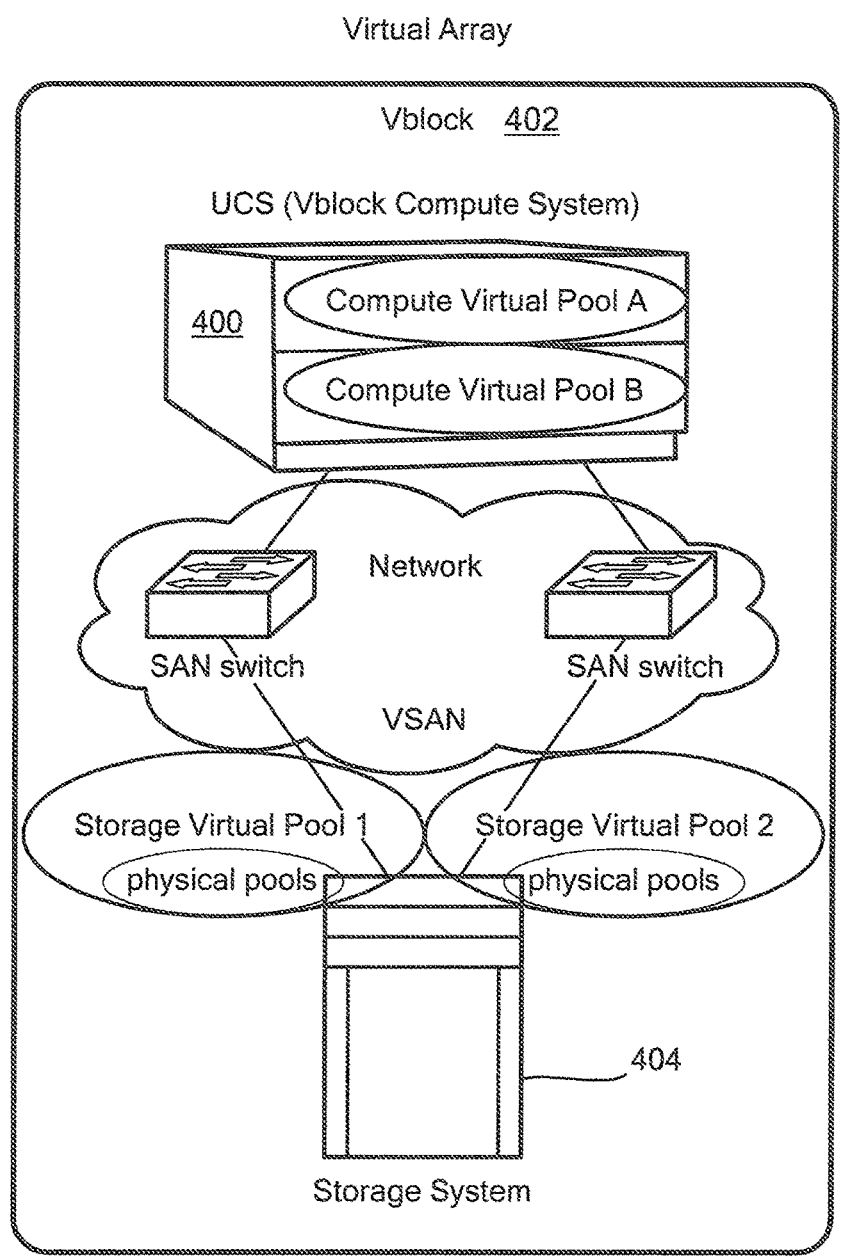
FIG. 4 is a schematic representation showing further detail of a virtual array in FIG. 1 including compute virtual pools and storage virtual pools and third party driver integration in accordance with illustrative embodiments of the invention.

FIG. 4 shows controller compute virtual pools A, B as a virtual abstraction of a group of physical compute elements 400, such as Cisco Unified Computing System (UCS) blades. Compute virtual pools A, B are created in the controller when there is at least one logical compute system under controller management. Each logical compute system contains compute elements, in the way that a UCS contains one or more chassis that contain the blades. Administrators can add a compute system to controller as a physical asset. The UCS systems can be referred to as vblock compute systems having SAN switches for providing a path to storage from which storage virtual pools are created.

Once a virtual array is created, and the compute virtual pool is associated with the virtual array, the controller understands which UCS systems have visibility to storage and will use that information during the process of creating compute virtual pools and provisioning.

Compute virtual pools are the abstraction used to create pools of hosts. Compute virtual pools abstract physical compute elements such as UCS blades, and storage virtual pools abstract physical storage in underlying storage arrays. Compute virtual pools are used to provision hosts while storage virtual pools are used to provision storage. When the controller creates a compute virtual pool, specific blades can be assigned to a compute virtual pool, or define qualifiers (such as memory, CPU speed, processors, etc.) that allow the controller to automatically assign the blades to a pool based on the criteria of the qualifier.

In embodiments, a controller provides storage drivers supporting a wide range of storage hardware where the drivers, which can be provided by third parties, are integrated with the controller with appropriate security. As described more fully below, a framework provides for the integration of drivers from storage array vendors. With this framework, vendors can debug and develop drivers, expose certain features, and integrate the driver inside a controller. The framework specifies APIs for vendor driver implementation to enable features of the arrays to be available. The framework provides system security as external program code becomes part of the controller by monitoring the external driver and blocking unnecessary/unauthorized data flow.

Figure 5:
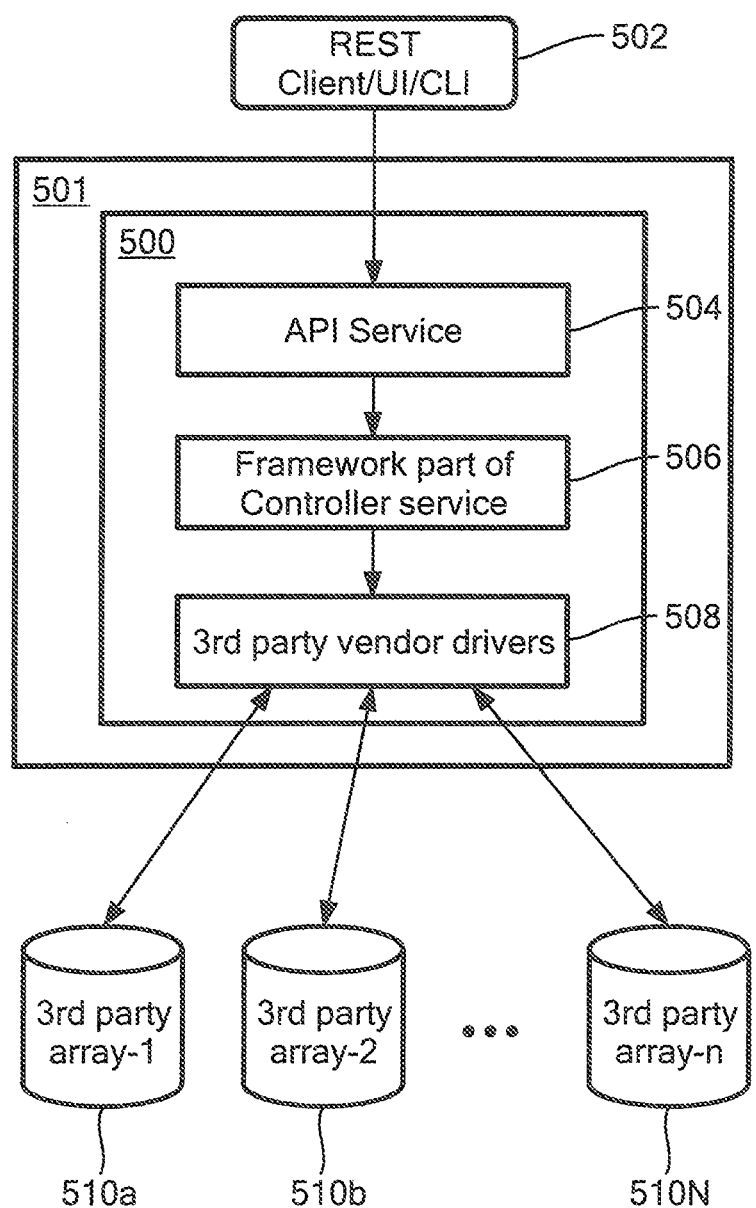
FIG. 5 is a diagram showing component processing flow for a storage array and a controller of a storage abstraction platform having third party driver integration in accordance with illustrative embodiments of the invention.

FIG. 5 shows a driver module 500 that can form part of a controller 501, which abstracts, pools, and automates physical storage infrastructure as described above. The driver module 500 includes an interface 502 that can include a client, user and command line interface, such as via a REST interface, coupled to an API service 504. A framework 506, which is coupled to the API service 504, provides vender driver integration and security, as described more fully below. The vendor driver module 508 includes a series of vendor drivers for heterogeneous storage arrays 510a-N, which can be provided by multiple third party vendors. As used herein, third party driver refers to a driver that is generated by an entity that is different from the entity providing the controller.

When a request comes from a controller interface, for example, the request goes through the API service 504 to the framework 506. The framework/controller service 506 analyzes the request and calls the appropriate vendor driver in the vendor driver module 508 and provides the required parameters. The vendor driver module 508 processes the request using the appropriate driver, communicates with the designated storage array 510, and receives a value from the array.

In illustrative embodiments, the vendor driver client communicates with third party vendor drivers through a JAVA RMI (remote method invocation) mechanism. When code from a third party vendor becomes part of the controller, it will be appreciated that the existing system and controller should remain secure.

In embodiments, a JAVA security manager provides a mechanism by which users can run untrusted bytecode in a 'sandboxed' environment by supporting a policy driven security model which places restrictions on FileSystem read/writes and socket operations through the security manager.

Figure 6:
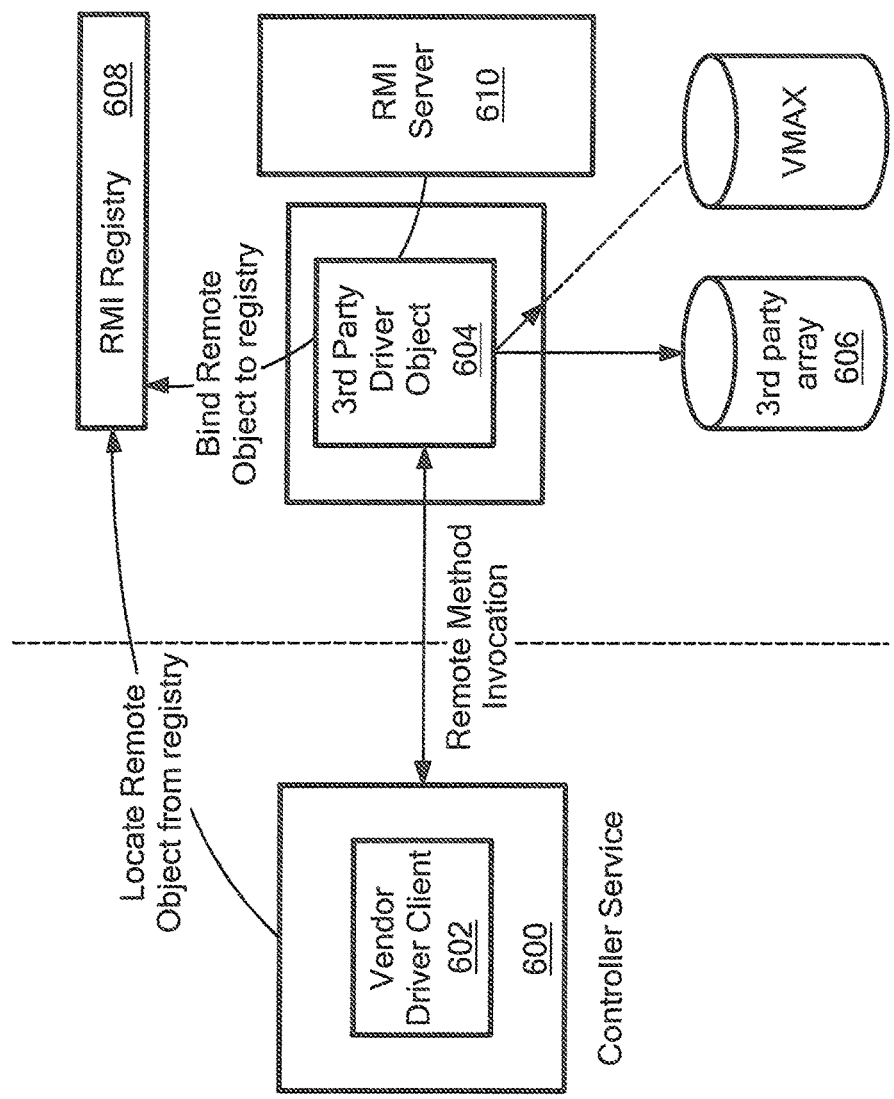
FIG. 6 is a diagram showing component processing flow for a storage array and a controller of a storage abstraction platform having third party driver integration including remote method invocation in accordance with illustrative embodiments of the invention.

FIG. 6 shows a system having integrated drivers with a controller in accordance with embodiments of the invention. A controller service 600 includes a vender driver client module 602 that communicates with a driver object 604, such as a third party provided driver object, via a remote method invocation (RMI). An array 606 corresponding to the driver object 604 is then accessed. The controller service 600 locates the remote object in a RMI registry module 608. A RMI server 610 binds remote objects in the RMI registry 608.

It is understood that JAVA RMI implementations use stub and skeleton objects to provide the connection between the client, such as controller service 600, and the remote object, such as driver object 604. A stub is a proxy for a remote object which is responsible for forwarding method invocations from the client to the server where the actual remote object implementation resides. A client reference to a remote object, therefore, is actually a reference to a local stub. The client has a local copy of the stub object. A skeleton is a server-side object which contains a method that dispatches calls to the actual remote object implementation. A remote object has an associated local skeleton object to dispatch remote calls to it.

It is understood that the controller service 600 should avoid drivers having Read/Write permission on other directories/files and should allow only required functionalities, such as REST calls from drivers to arrays. In addition, the controller 600 should ensure require permission run the third party drive objects 602.

During initial configuration vendor drivers 602 will be loaded via a JAVA security manager pointing policy file. A policy file can allow/block particular directories/files with read/write permission. Similarly it is possible to allow/block particular ports to listen/connect. When the vendor driver tries to extract any information from some other array, such as the illustrated VMAX array, the request is denied.

In the table below, there are columns for Policy File, Load Third Party Driver and Security. The first row shows no policy file and the second row shows a blank policy file, which results in full restriction, i.e., access denied. The third row shows a policy file with read and write permission for a third party driver to enable access to an array for that driver.

| Policy file | Load 3$^{rd}$ party driver | Security |
| --- | --- | --- |
| None | java VendorDriver | SecurityManager: null |
| Blank without any content (Full restriction)<br>grant {<br>}; | java -<br>java.security.manager -<br>Djava.security.policy=tight.policy<br>VendorDriver | SecurityManager:<br>java.lang.SecurityManager@1a46e30<br>Exception in thread<br>"main"<br>java.security.AccessControlException:<br>access denied |
| Allow necessary permission<br>grant {<br>   permission<br>java.io.FilePermission<br>"vendor.txt", "read,<br>write";<br>permission<br>java.net.SocketPermission<br>"localhost",<br>"accept, connect,<br>listen"<br>}; | java -<br>java.security.manager -<br>Djava.security.policy=optimum.policy<br>VendorDriver | SecurityManager:<br>java.lang.SecurityManager@1a46e30<br>File successfully opened |

With this arrangement, third party drivers come under the controller's control. In addition, features of the third party arrays are exposed through the controller while providing security for the overall system. The framework provides external code without comprising system security. In embodiments, communication is straightforward by use of a single REST interface. In addition, third party array vendors can modify and maintain their drivers.

Figure 7:
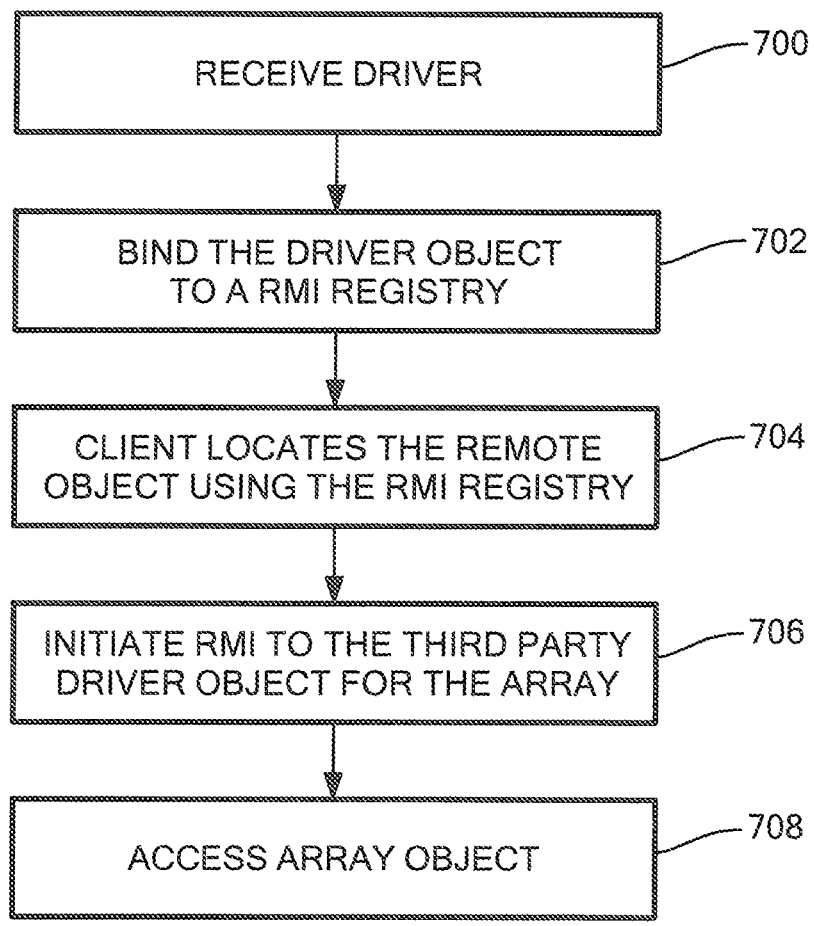
FIG. 7 is a flow diagram showing an illustrative sequence of steps for processing flow for a storage array and a controller of a storage abstraction platform having third party driver integration in accordance with illustrative embodiments of the invention.

FIG. 7 shows an illustrative sequence of steps for providing integrated drivers in a storage automation system in accordance with embodiments of the invention. In step 700, a driver object is received. The driver can comprise a driver for a third party array, for example. In step 702, a RMI server binds the object to a RMI registry to enable clients to locate the object. In step 704, the client can locate the remote object using the RMI registry. In step 706, a client, such as a controller service, wishing to interact with an array, for example, initiates a RMI to the third party driver object for the array. In step 708, the third party array is accessed, such for a read/write operation.

Figure 8:
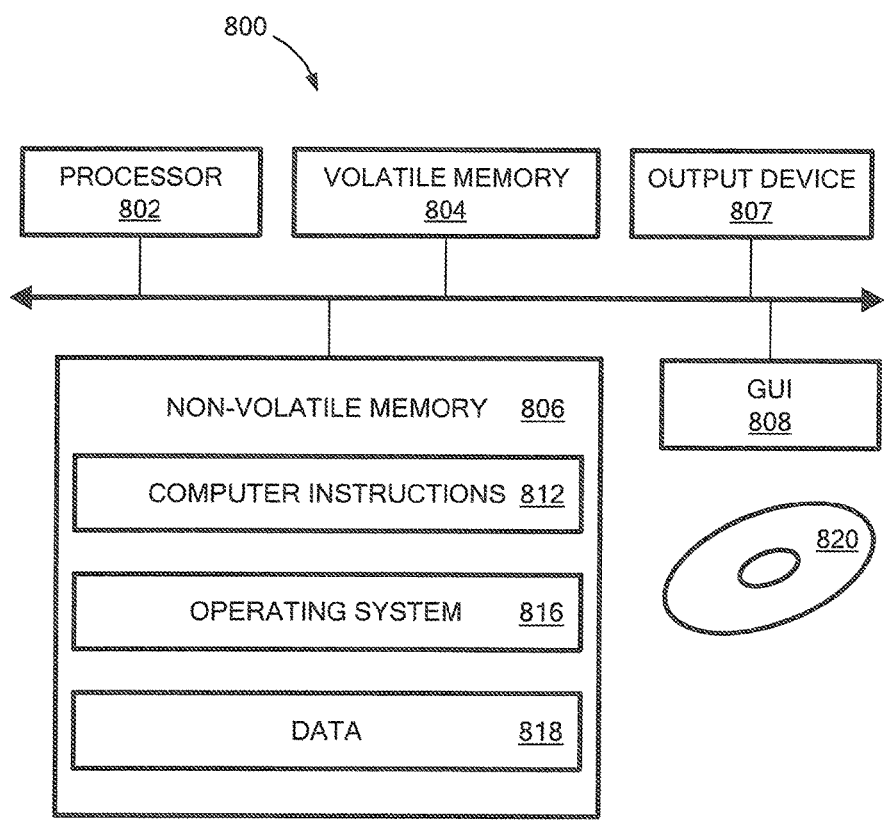
FIG. 8 is a schematic representation of an illustrative computer than can perform at least a portion of the processing described herein.

FIG. 8 shows an exemplary computer 800 that can perform at least part of the processing described herein. The computer 800 includes a processor 802, a volatile memory 804, a non-volatile memory 806 (e.g., hard disk), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
receiving an access request for a storage array from a controller of a platform that abstracts, pools and automates physical storage for a data center;
processing the access request with an API service;
analyzing the access request by the controller after processing by the API service;
requesting, by the controller, a third party driver from a driver module for the storage array;
loading, by the controller, the third party driver via a security manager that is specified by a policy file, the security manager providing a sandboxed environment for executing the third party driver in accordance with vendor-specific read and write permissions that are included in the policy file; and
processing the request by the third party driver to access the storage array, and receiving data from the storage array,
wherein the policy file is configured to include vendor-specific read and write permissions corresponding to a vendor of the third party driver that limit access to read/write operations to only the storage array, thereby causing features of the storage array to be exposed through the controller, and
wherein the controller limits functionality of the third party driver to REST calls from the third party driver to the storage array.

2. The method according to claim 1, further including binding, by a RMI server, a remote object for the third party driver in a RMI registry.

3. The method according to claim 2, further including locating the remote object in the RMI registry by the controller.

4. The method according to claim 3, further comprising, after locating the remote object, using remote method invocation by a client to contact the remote object.

5. The method according to claim 1, further including configuring the policy file to allow/block particular directories/files with read/write permission.

6. The method according to claim 1, further including configuring the policy file to allow/block particular ports to listen/connect.

7. The method according to claim 1, further including receiving an updated version of the third party driver.

8. The method according to claim 1, wherein the platform comprises a compute system having compute virtual pools created in the controller, wherein the compute system comprises SAN switches for providing at least one path to storage in which storage virtual pools are created.

9. The method according to claim 8, wherein the compute virtual pools provide an abstraction to create pools of hosts.

10. An article, comprising:
a non-transitory computer readable medium having stored instructions that cause a computing system to perform the operations of:
receiving an access request for a storage array from a controller of a platform that abstracts, pools and automates physical storage for a data center;
processing the access request with an API service;
analyzing the access request by the controller after processing by the API service;
requesting, by the controller, a third party driver from a driver module for the storage array;
loading the third party driver via a security manager that is specified by a policy file, the security manager is configured to provide a sandboxed environment for executing the third party driver in accordance with vendor-specific read and write permissions that are included in the policy file; and
processing the request by the third party driver to access the storage array and receive data from the storage array;
wherein the policy file is configured to include vendor-specific read and write permissions corresponding to a vendor of the third party driver that limit access to read/write operations to only the storage array, thereby causing features of the storage array to be exposed through the controller, and wherein the controller limits functionality of the third party driver to REST calls from the third party driver to the storage array.

11. The article according to claim 10, wherein the instructions further cause the computing system to perform the operation of binding, by a RMI server, a remote object for the third party driver in a RMI registry.

12. The article according to claim 11, wherein the instructions further cause the computing system to perform the operation of locating the remote object in the RMI registry by the controller.

13. The article according to claim 12, wherein the instructions further cause the computing system to perform the operation of, after locating the remote object, using remote method invocation by a client to contact the remote object.

14. The article according to claim 10, wherein the instructions further cause the computing system to perform the operation of configuring the policy file to allow/block particular directories/files with read/write permission.

15. The article according to claim 10, wherein the instructions further cause the computing system to perform the operation of configuring the policy file to allow/block particular ports to listen/connect.

16. A system comprising:
a computer having a memory and one or more processors;
computer-executable logic enabled to be executed on the one or more processors;
a platform to abstract, pool and automate physical storage for a data center, the platform including:
a controller to receive an access request for a storage array; and
an API service to process the access request;
wherein the controller is configured to:
analyze the access request after processing by the API service;
request a third party driver from a driver module for the storage array, wherein the third party driver is configured to process the access request;
load the third party driver via a security manager that is specified by a policy file, the security manager is configured to provide a sandboxed environment for executing the third party driver in accordance with vendor-specific read and write permissions that are included in the policy file; and
receive data from the storage array,
wherein the policy file is configured to include vendor-specific read and write permissions corresponding to a vendor of the third party driver that limit access to read/write operations to only the storage array, thereby causing features of the storage array to be exposed through the controller, and
wherein the controller limits functionality of the third party driver to REST calls from the third party driver to the storage array.

* * * * *